(12) United States Patent
Watanabe et al.

(10) Patent No.: US 6,963,815 B2
(45) Date of Patent: Nov. 8, 2005

(54) TEST SUPPORT PROGRAM AND TEST SUPPORT METHOD

(75) Inventors: Yuzuru Watanabe, Kawasaki (JP);
Yuichi Takada, Kawasaki (JP);
Yasuyuki Fujikawa, Kawasaki (JP);
Kenichi Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 18 days.

(21) Appl. No.: 10/828,057

(22) Filed: Apr. 20, 2004

(65) Prior Publication Data

US 2005/0049815 A1    Mar. 3, 2005

(30) Foreign Application Priority Data

Aug. 25, 2003  (JP) .............................. 2003-208522

(51) Int. Cl.[7] .......................................... G06F 19/00
(52) U.S. Cl. ...................... 702/123; 702/121; 702/122; 709/203
(58) Field of Search ....................... 702/108, 119, 121, 702/122, 123; 709/201, 203, 217, 219; 707/8, 707/10; 719/313–315

(56) References Cited

U.S. PATENT DOCUMENTS

| | | | | |
|---|---|---|---|---|
| 5,999,972 A | * | 12/1999 | Gish | 709/219 |
| 6,272,555 B1 | * | 8/2001 | Gish | 719/315 |
| 2004/0058694 A1 | * | 3/2004 | Mendiola et al. | 455/466 |

FOREIGN PATENT DOCUMENTS

JP         2000-132425           5/2000

* cited by examiner

Primary Examiner—Bryan Bui
(74) Attorney, Agent, or Firm—Greer, Burns & Crain, Ltd.

(57) ABSTRACT

A test support program to effectively and reliably check performance of functions which operate with other unspecified servers. A pair of a request message and a response message is stored as a message log. When a processing function based on a program under development being checked outputs a test request message, a computer selects a message log appropriate to the test request message as a template message under preset selection rules. The computer creates a test response message by editing the response message of the selected template message under preset editing rules. Then the computer sends the created test response message as a response to the test request message.

12 Claims, 15 Drawing Sheets

| | | |
|---|---|---|
| CONTENT REPLACEMENT | DATE | SET THE CURRENT DATE |
| | | ADD DAYS |
| | | SUBTRACT DAYS |
| | | CHANGE A DATE FORMAT |
| | TIME | SET THE CURRENT TIME |
| | | ADD TIME |
| | | SUBTRACT TIME |
| | | CHANGE A TIME FORMAT |
| | NUMERIC VALUE | ADD VALUE |
| | | SUBTRACT VALUE |
| | | CHANGE NUMERIC VALUE FORMAT (EDITION FOR COMMA OR DIGIT FOR DECIMAL POINT) |
| | | FOUR OPERATION ARITHMETIC |
| | | SET RANDOM NUMBERS |
| | CHARACTER STRING INCLUDING DATE, TIME AND NUMERIC VALUE | SET FIXED VALUE |
| | | DELETE CHARACTER STRING |
| | | COMBINE CHARACTER STRINGS |
| XML-DOCUMENT REPLACEMENT | TAG | DELETE |
| | | ADD |
| | | EXCHANGE POSITIONS |

FIG. 15

TEST SUPPORT PROGRAM AND TEST SUPPORT METHOD

CROSS-REFERENCE TO RELATED APPLICATIONS

This application is based upon and claims priority of Japanese Patent Application No. 2003-208522, filed on Aug. 25, 2003, the contents being incorporated herein by reference.

BACKGROUND OF THE INVENTION (1) Field of the Invention

This invention relates to a test support program and method for checking program performance, and more particularly, to a test support program and method for checking program performance with a stub.

(2) Description of the Related Art

When we develop software, we always verify its operation before actual use. Preferably, we occasionally verify the operation in the middle of programming to increase efficiency of the development. To check the operation, stubs which serve as incomplete functions are prepared. A stub is a mediation program so that a program can call up another program. In operation check, the stub returns a prescribed response to a call made based on a program being checked, according to the predefined program design, instead of incomplete functions. Therefore, even if some functions are incomplete, the operation of the other functions can be checked.

With such stubs we can easily conduct automatic operation check. For example, a stub group composed of plural stubs is prepared. When a module is called up while software being tested is running, a stub corresponding to the module is selected from the prepared stub group under predefined conditions and executed (for example, refer to Japanese Unexamined Patent Publication No. 2000-132425).

Recently, electronic commerce (e-commerce) over the Internet is very common. Companies order products or send quote over the Internet with their web servers by e-commerce.

In developing e-commerce systems, reliable operation test cannot be conducted because data cannot be sent to business partners' systems. That is, in e-commerce between companies, each partner's system and the own system communicate with each other via a network. Therefore, to establish an e-commerce system, not only the own system but also connection with partners' systems should be tested. However, the business partners will get troubled if they receive a large amount of test data every time when a regression test is performed for modification of the own system. This regression test is conducted when a program is modified, in order to see if unintended results occur due to the modification.

In addition, even if message can be sent to partners' servers for the operation check, desired responses would not be returned. Therefore, the test cannot be done for various situations that probably occur, which results in an inefficient and unreliable test. For example, to check system performance for a situation where a partner's server is under maintenance, the partner's server should be actually under maintenance. In other words, the operation check cannot be performed until the partner's server enters into maintenance.

As an alternative method, a regression test with a stub can be considered, the stub simulating the functions of a partner's server. However, since the performance of the partner's server is designed by the business partner, responses cannot be specified at the time of development of the own e-commerce program. The conventional stubs employ any of the following methods.

Automatically create and return a response form by applying some rules (continuous number or random number).

Keep transactions sent from business partners as they are, and use them as response forms in test.

Automatically create and return data of a response form based on the data of an input form.

However, all the above methods are unpractical in view of objectives of creating and returning a response which is appropriate to a request form and is effective in test. That is, since the stub makes responses (including intentional error responses) according to a predefined program design, various kinds of responses which are probably sent from business partners in e-commerce should be analyzed and defined. This analysis and definition, however, require thousands of man-hours. This is impracticable.

SUMMARY OF THE INVENTION

In view of foregoing, the present invention intends to provide a test support program and method for effectively and reliably checking the performance of functions which operate with other unspecified servers.

To achieve the above object, there provided a test support program to check program performance. This test support program causes a computer to execute the steps of storing, when a request message is sent to a partner server over a network and a response message arrives from the partner server, a pair of the request message and the response message as a message log, selecting, when a processing function based on a program under development being checked outputs a test request message, a message log appropriate to the test request message as a template message under preset selection rules, creating a test response message by editing the response message of the selected template message under preset editing rules, and sending the created test response message as a response to the test request message.

Further, to achieve the above object, there provided a test support method for checking program performance. This test support method causes a computer to execute the steps of storing, when a request message is sent to a partner server over a network and a response message arrives from the partner server, a pair of the request message and the response message as a message log, selecting, when a processing function based on a program under development being checked outputs a test request message, a message log appropriate to the test request message as a template message under preset selection rules, creating a test response message by editing the response message of the selected template message under preset editing rules, and sending the created test response message as a response to the test request message.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 15 shows an example of data replacement patterns.

DESCRIPTION OF THE PREFERRED EMBODIMENTS

Hereinafter, preferred embodiments of the present invention will be described in detail with reference to attached drawings.

The following description will first outline the invention and then give a more specific explanation for how the invention will be implemented.

Figure 1:
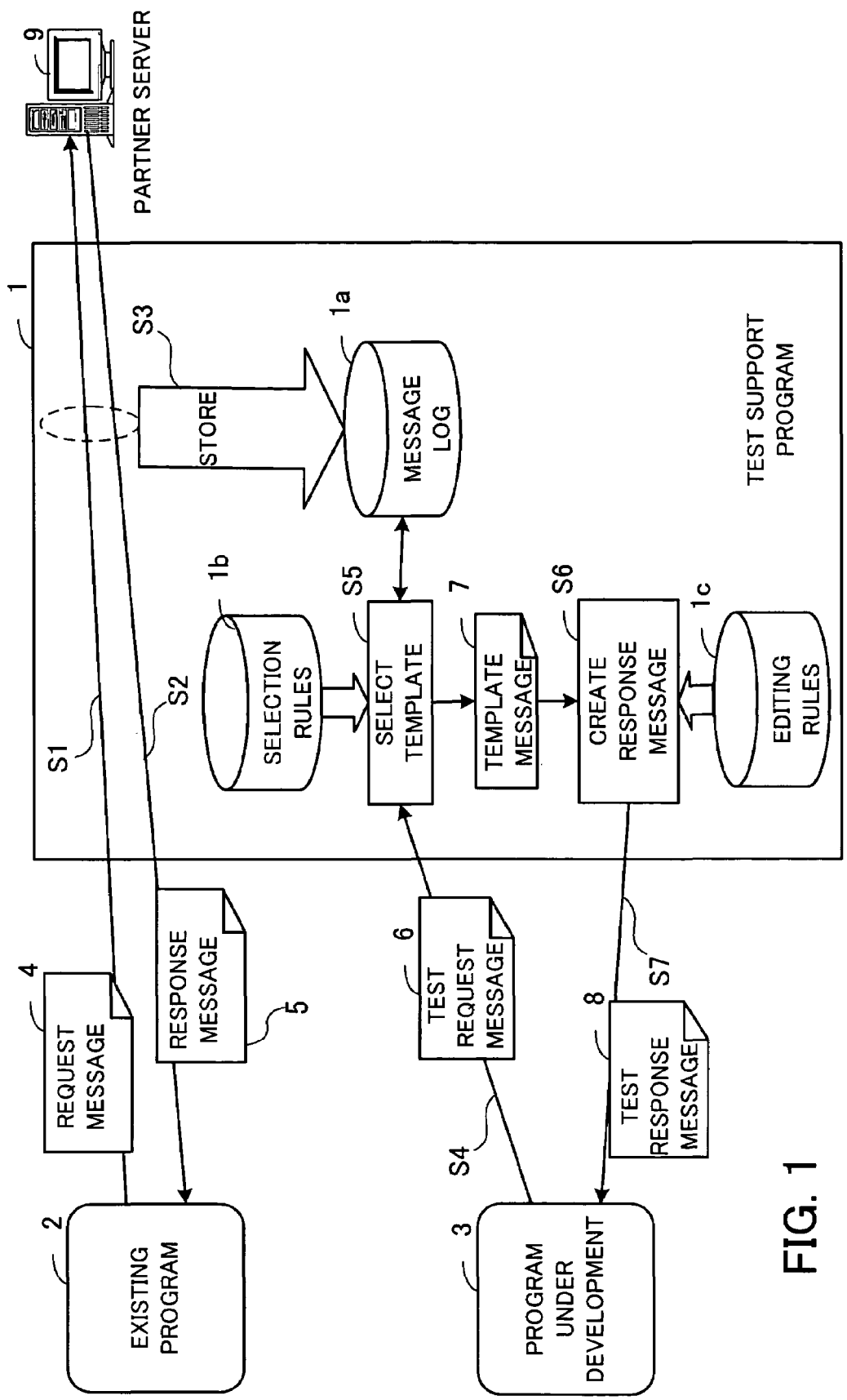
FIG. 1 shows the concept of the invention which is applied to this embodiment.

FIG. 1 shows the concept of the present invention which is applied to this embodiment. A test support program 1 causes a computer to execute processes shown in FIG. 1. A processing function (process, task or thread) based on an existing program 2 sends a request message 4 to a partner server 9 over a network (step S1). The partner server 9 sends a response message 5 to the requesting processing function based on the existing program 2 (step S2). At this time, the computer executing the test support program 1 stores a pair of the request message 4 and the response message 5 as a message log 1a (step S3).

Then when a processing function based on a program under development 3 being checked outputs a test request message 6 (step S4), the computer executing the test support program 1 receives this message 6. The computer selects a message log appropriate to the test request message 6 as a template message 7 under preset selection rules 1b (step S5). Then the computer creates a test response message 8 by editing the response message of the selected template message 7 (by processing data) under preset editing rules 1c (step S6). The computer sends the created test response message 8 as a response to the test request message 6 (step S7).

The test response message 8 sent is received by a processing function based on the program under development 3 and is processed according to the program design. When the test response message 8 is processed as intended, it means that the program 3 has no bug. When the test response message 8 is not processed as intended or when a trouble happens, on the contrary, it means that the program 3 has to be modified.

In this way, a realistic test response message 8 can be easily created by selecting and editing an appropriate message out of past message logs as a template. If a past message log is used as a test response message 8 without edition, for example, date information will cause an error. By changing the date information so as to indicate the current date, the test response message 8 is made error-free.

In recent electronic commerce (e-commerce), messages written in extensible markup language (XML) are often exchanged. XML is a tag-based structural document language. With XML, tags can be defined as desired and simple documents can be processed as data. In addition, by using a schema, a numeric value written on a "price" tag can be identified as "numeric data indicating a price". Therefore, XML is useful for exchange of messages such as orders in e-commerce.

The embodiment of this invention will be described in detail for a case where this invention is applied to a server which is used for e-commerce transactions with XML structural documents. In the e-commerce, a request message, a response message and a message log are referred to as a request form, a response form, and a transaction log, respectively.

Figure 2:
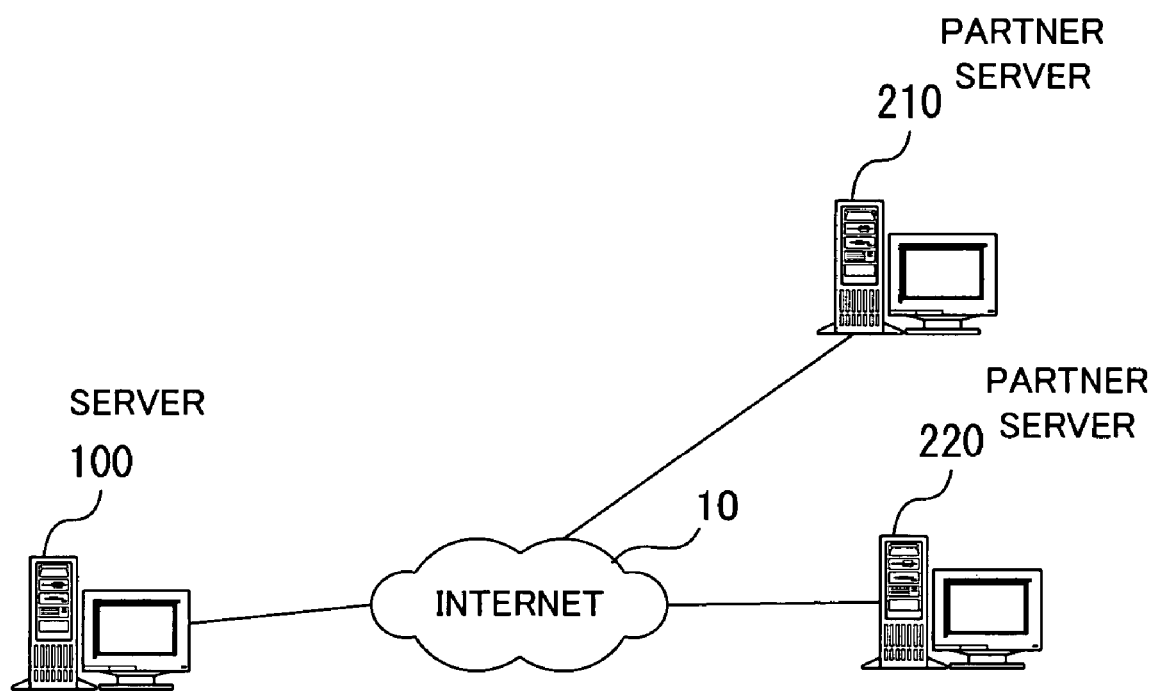
FIG. 2 shows the system structure of the embodiment of this invention.

FIG. 2 shows the system structure of the embodiment of this invention. Referring to FIG. 2, a server 100 installed for e-commerce is connected to partner servers 210 and 220 over the Internet 10. The server 100 is a computer with an application program to do e-commerce. Similarly, the partner servers 210 and 220 are also computers of business partners for e-commerce.

Figure 3:
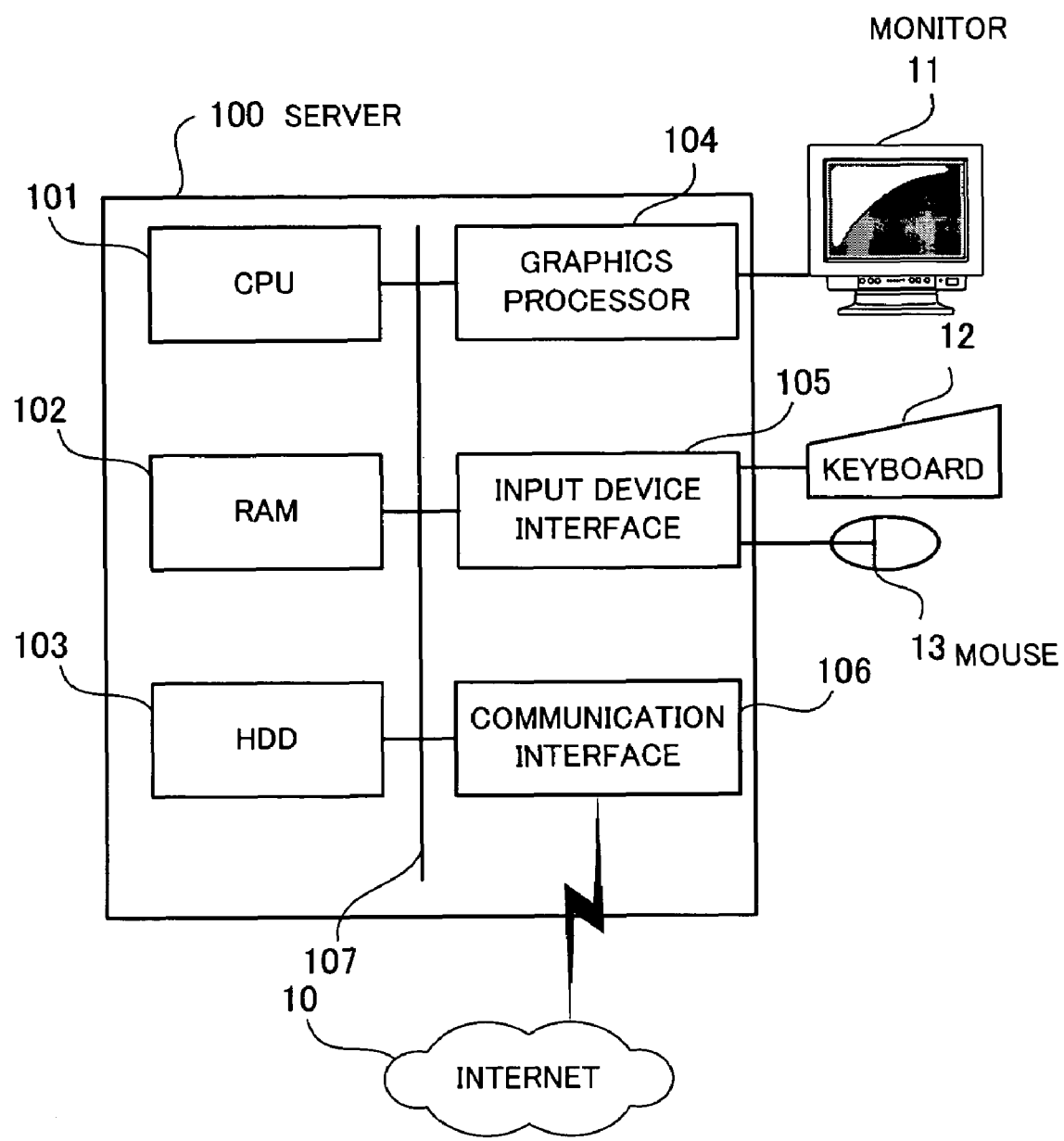
FIG. 3 shows the hardware structure of a server used in the embodiment of this invention.

FIG. 3 shows the hardware structure of a server used in the embodiment of this invention. The server 100 has a central processing unit (CPU) 101 for controlling the entire operation of the server 100. Connected to the CPU 101 are a random access memory (RAM) 102, a hard disk drive (HDD) 103, a graphics processor 104, an input device interface 105, and a communication interface 106 via a bus 107.

The RAM 102 temporarily stores at least a part of an operating system (OS) program and application programs. The RAM 102 also stores various kinds of data necessary for CPU processing. The HDD 103 stores the OS and application programs.

The graphics processor 104 is connected to a monitor 11 to display images on the monitor 11 under the control of the CPU 101. The input device interface 105 is connected to a keyboard 12 and a mouse 13 to transfer signals from the keyboard 12 and the mouse 13 to the CPU 101 via the bus 107.

The communication interface 106 is connected to the Internet 10 to communicate data with other servers over the Internet 10.

The above hardware structure can realize the processing functions of this embodiment. It should be noted that the hardware structure of FIG. 3 is shown as that of the server 100 but also can be applied to the partner servers 210 and 220.

By loading a test support program in the server 100 having such a hardware structure, the server 100 is capable of creating data which is "appropriate to a request form and effective in test" by the following three steps.

1. Collect actual business transactions and store a pair of transactions (request form and response form).
2. Compare a test request form with the stored request forms under selection rules for XML tags set by a user, and use a response form corresponding to a matching request form as a template response form.
3. Edit the template response form or the request form under editing rules for XML tags (by copy or replacement) and return it as a test response form. This procedure results in the following advantages.

A stub is able to create and return more realistic data from few actual transactions.

A stub is able to return error data by changing replacement rules. This is a test case that cannot be obtained in actual communication with partner servers.

Now, the processing functions of the server 100 to realize the above processes will be described in detail.

Figure 4:
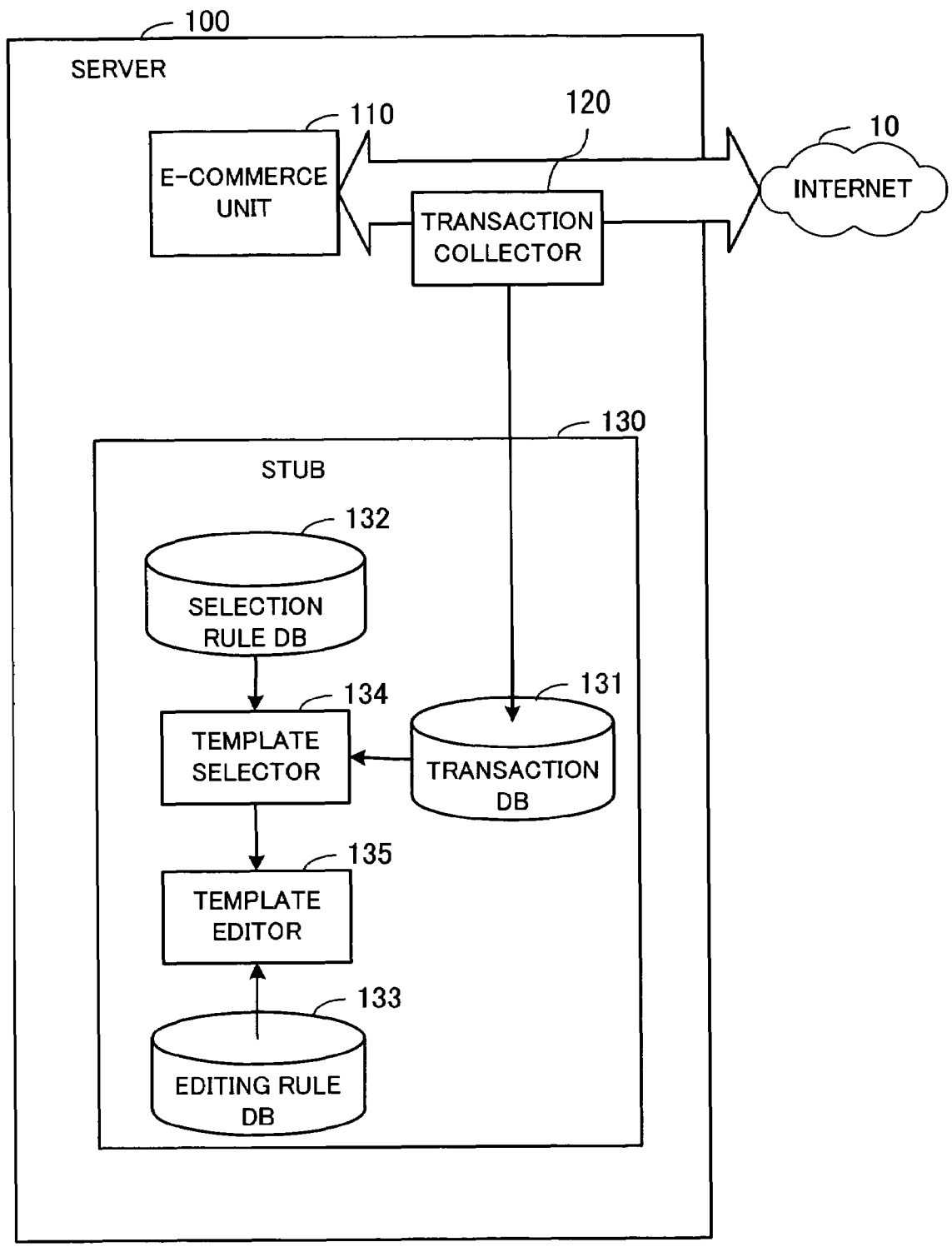
FIG. 4 is a block diagram showing the functions of the server.

FIG. 4 is a block diagram showing the functions of the server. The server 100 is composed of an e-commerce unit 110, a transaction collector 120 and a stub 130.

The e-commerce unit 110 is a processing function to do e-commerce and is realized by software. The e-commerce unit 110 communicates with the partner servers 210 and 220 for e-commerce. For example, when a user of the server 100 intends to purchase products by e-commerce, the e-commerce unit 110 accesses a partner server 210, 220 to obtain quote. Then, in response to user inputs, the e-commerce unit 110 orders the products to the partner server 210, 220. When a part or the whole of the program describing the processing of the e-commerce unit 110 is modified, a regression test is performed with the stub 130.

The transaction collector 120 obtains transactions done between the e-commerce unit 110 and the partner servers 210 and 220, and stores them in a transaction database (DB) 131. Specifically, the transaction collector 120 stores in the transaction DB 131 a pair of an order (request form) sent to a partner server 210, 220 from the e-commerce unit 110 and a response (response form) received by the e-commerce unit 110 from the partner server 210, 220.

The stub 130 simulates a transaction process which is executed by a partner server 210, 220, during the regression test. Specifically, the stub 130 returns a test response form required for operation check in response to a test request form. To realize this function, the stub 130 is provided with the transaction DB 131, a selection rule DB 132, an editing rule DB 133, a template selector 134, and a template editor 135.

The transaction DB 131 stores a pair of a request form and a response form communicated between the e-commerce unit 110 and the partner servers 210 and 220.

The selection rule DB 132 stores at least one selection rule indicating how to select a form to be used as a template from the transaction DB 131 in the regression test.

The editing rule DB 133 stores at least one editing rule indicating how to create a test response form based on a form selected as a template.

The template selector 134 receives a test request form from the e-commerce unit 110, and selects a form to be used as a template from the transaction DB 131 under selection rules being stored in the selection rule DB 132. The template selector 134 gives the selected form to the template editor 135.

Upon reception of the template form from the template selector 134, the template editor 135 edits this form under editing rules being stored in the editing rule DB 133. For example, the template editor 135 incorporates the contents of a part of the test request form (order number and date) into the template form. Then the template editor 135 gives the edited form as a test response form to the e-commerce unit 110 being checked.

Figure 5:
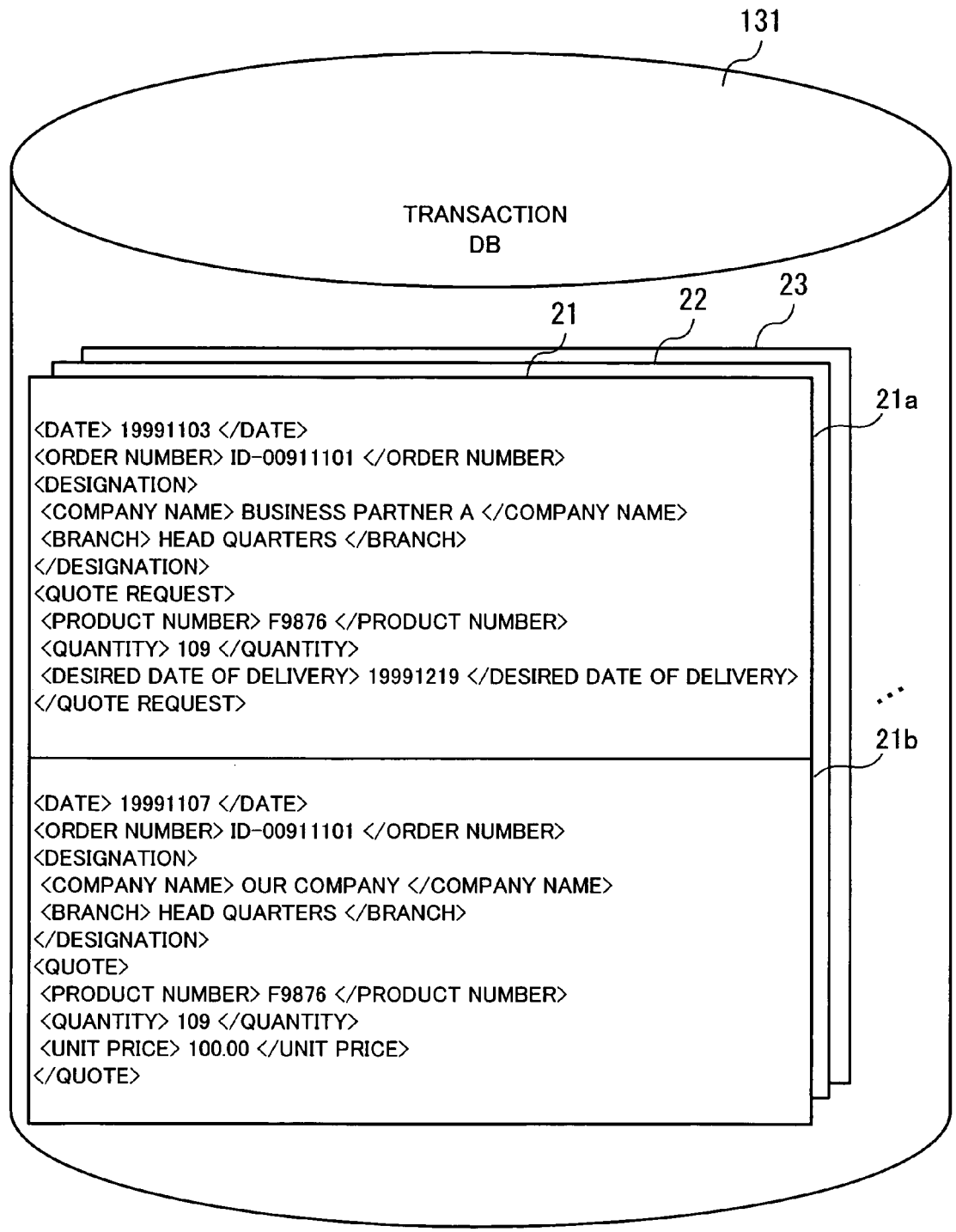
FIG. 5 shows the data structure of a transaction database (DB).

FIG. 5 shows the data structure of the transaction DB. The transaction DB 131 stores a plurality of transaction logs 21, 22, 23, . . . . Each transaction log is composed of a request form and a response form.

For example, the transaction log 21 is a transaction regarding quote for products. A request form 21a is a form asking the quote. A response form 21b is a form showing the quote.

Figure 6:
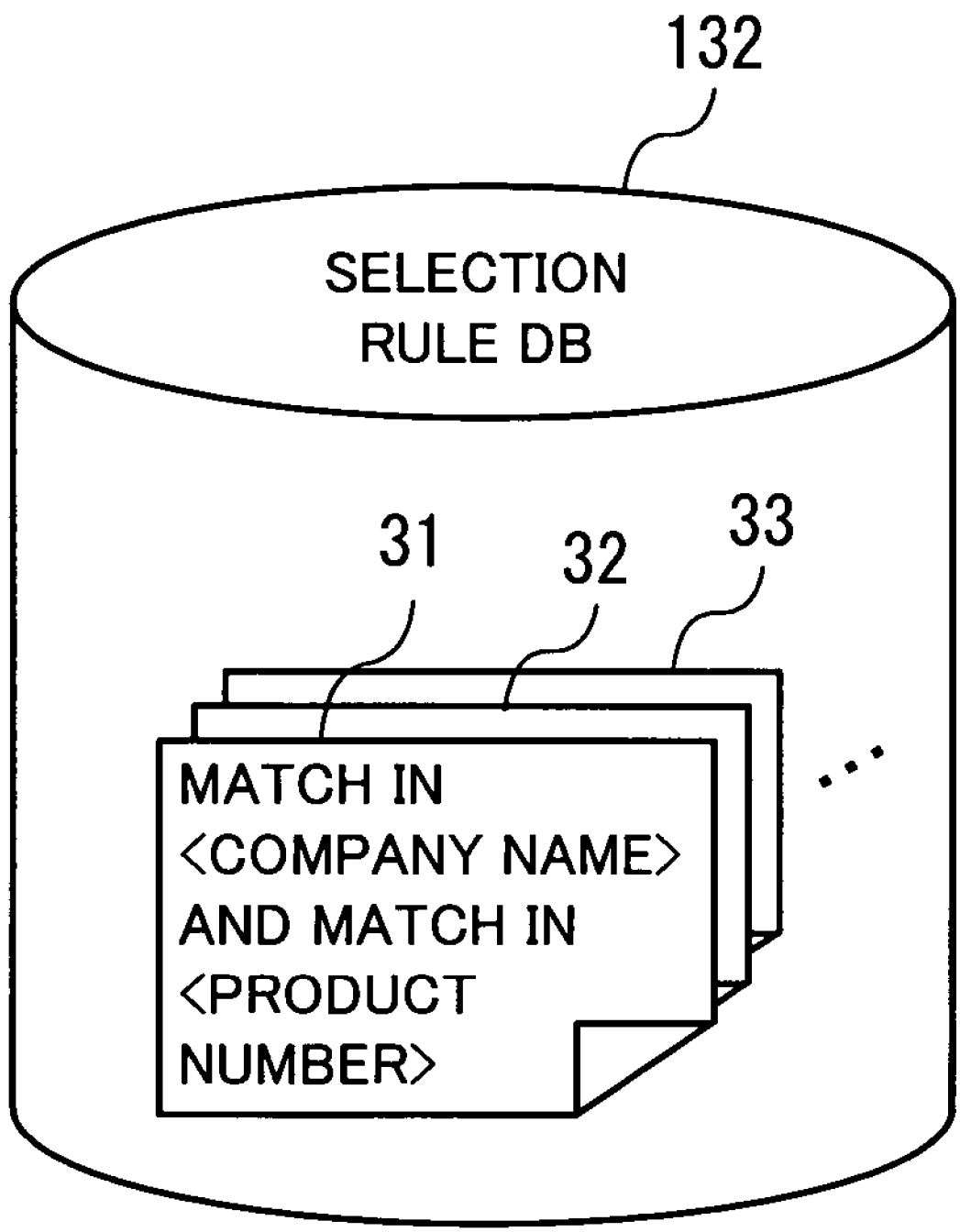
FIG. 6 shows the data structure of a selection rule DB.

FIG. 6 shows the data structure of the selection rule DB. The selection rule DB 132 stores a plurality of selection rules 31, 32, 33, . . . indicating how to select a transaction log as a template.

For example, the selection rule 31 is "match in <company name> and match in <product number>". A user specifies desired selection rules at the time of operation check.

Figure 7:
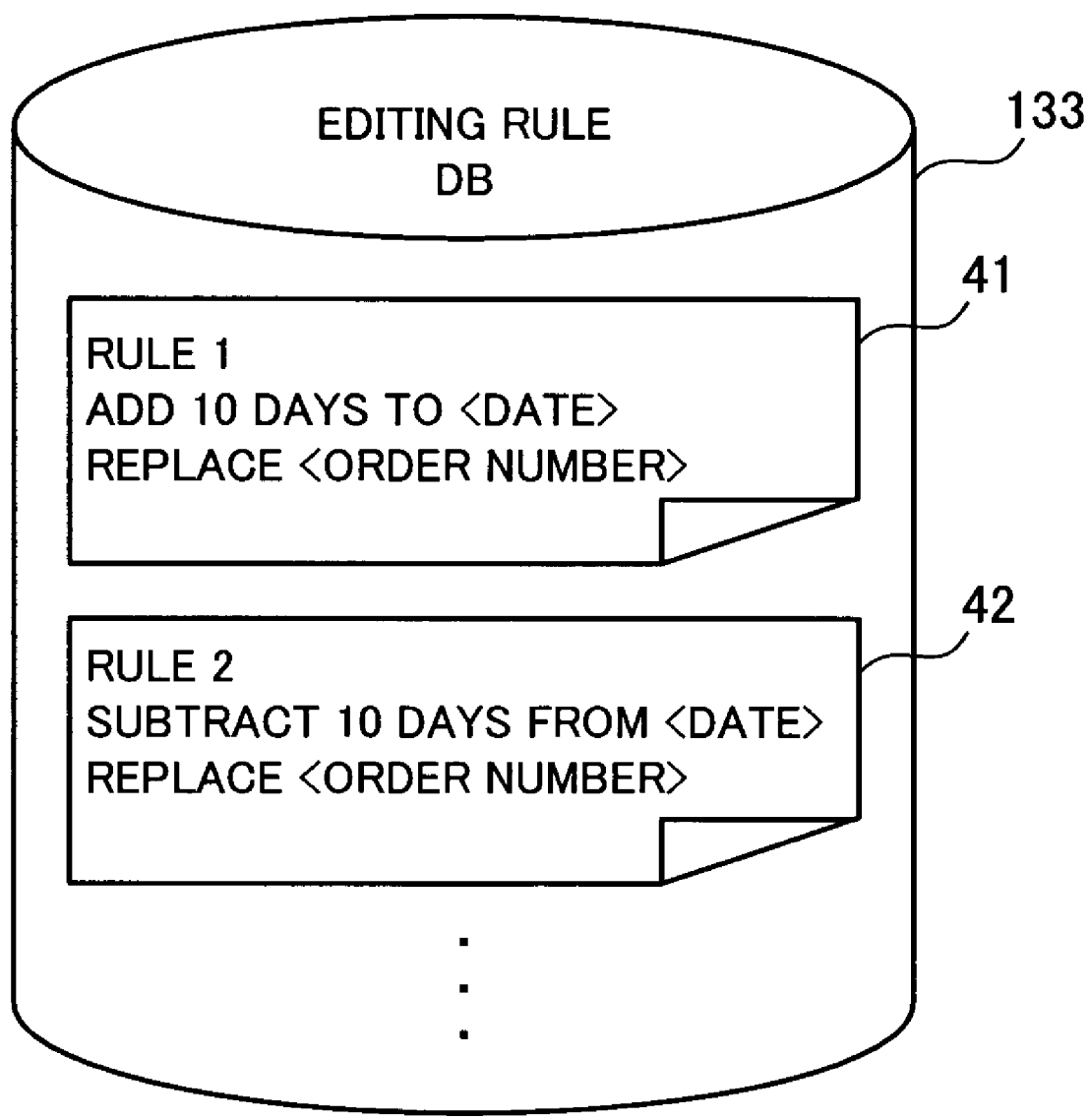
FIG. 7 shows the data structure of an editing rule DB.

FIG. 7 shows the data structure of the editing rule DB. The editing rule DB 133 stores editing rules 41, 42, . . . indicating how to edit the response form of a selected transaction log. The editing rules include replacement of item contents and insertion of new items.

For example, the editing rule 41 is "add ten days to <date> and replace <order number>". This editing rule 41 is used to return an error-free response. The editing rule 42 is "subtract ten days from <date> and replace <order number>". This editing rule 42 is used to return a response including an error in date. The rule "replace <order number>" in the editing rules 41 and 42 means that the order number of a form selected as a template is replaced with another unique order number.

The server 100 having the above structure performs the following processes.

Figure 8:
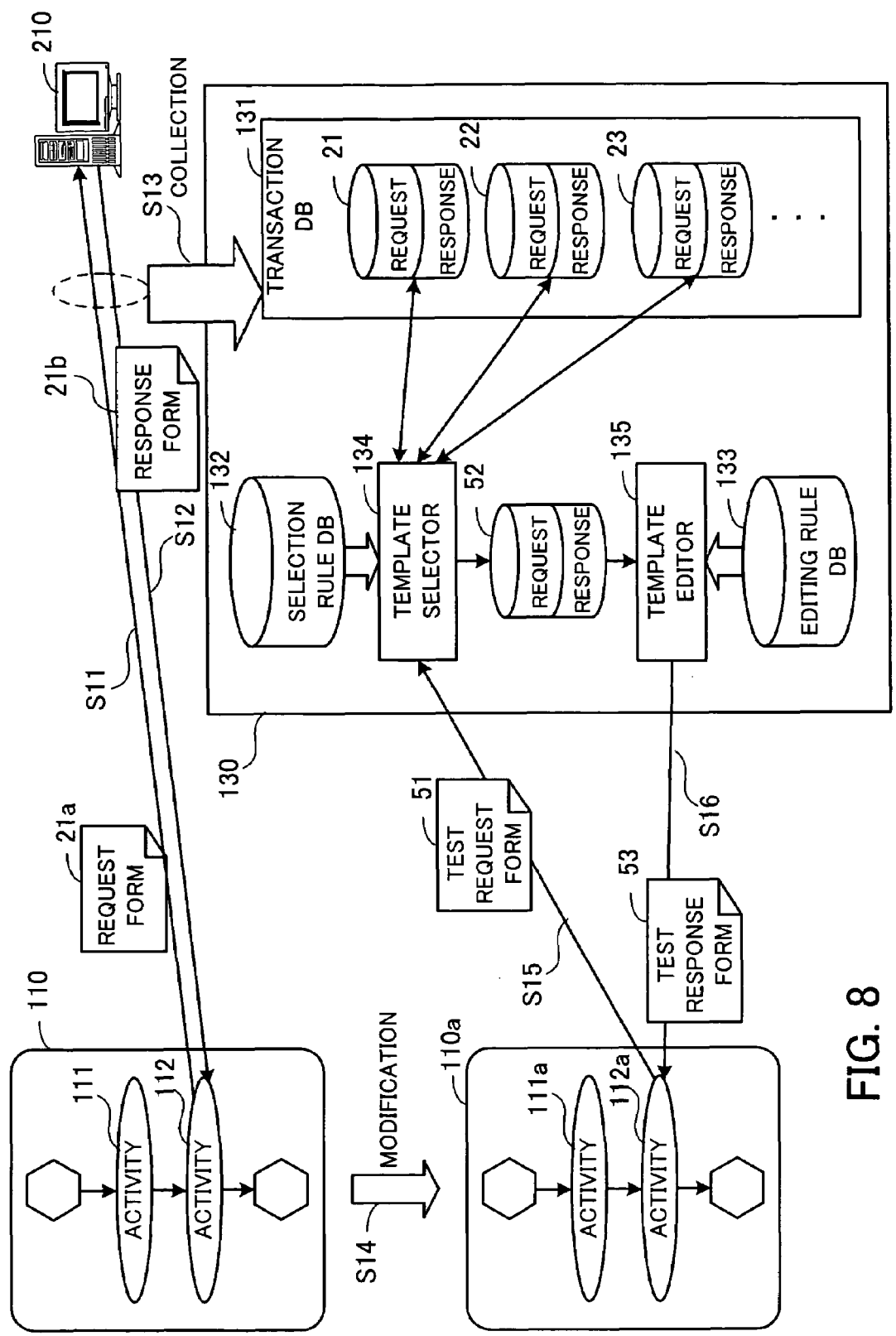
FIG. 8 shows server processes to check operation for electronic commerce.

FIG. 8 shows server processes to check operation for e-commerce. In the e-commerce unit 110, a plurality of activities (tasks) 111 and 112 are defined as e-commerce processes of the own company. In this example, the activity 112 communicates with the partner server 210 while the e-commerce unit 110 operates.

Specifically, the activity 112 sends a request form 21a to the partner server 210 (step S11). The partner server 210 returns a response form 21b to the e-commerce unit 110 (step S12). At this time, the transaction collector 120 stores a pair of the request form 21a and the response form 21b as a transaction log 21 in the transaction DB 131 (step S13).

After that, transaction logs 22, 23, . . . are stored in the transaction DB 131 every time when the activity 112 communicates with the partner servers 210 and 220. Therefore, the transaction DB 131 stores a great number of forms sent/received by the e-commerce unit 110. In this connection, forms of the same type are not necessarily stored in duplicate. In this case, when a form of the same type is obtained, the older form is deleted while the new order is stored.

Then a program describing the operation of the e-commerce unit 110 is modified (step S14). Based on the new program, an e-commerce unit 110a having activities 111a and 112a is created. Therefore, a regression test has to be conducted to see how the e-commerce unit 110a works. First, a user selects desired selection rules and editing rules from the selection rule DB 132 and editing rule DB 133 respectively.

Next, the user activates the e-commerce unit 110a so that the activity 112a outputs a test request form 51 (step S15). At this time, this test request form 51 is given to the template selector 134 in the stub 130, not to the partner server 210, 220.

The template selector 134 searches the transaction DB 131 for an appropriate transaction log under the selected selection rules (step S16). The selected transaction log is given to the template editor 135 as a template form 52.

Upon reception of the template form 52, the template editor 135 creates a test response form 53 by editing the template form 52 under the selected editing rules. Specifically, the template editor 135 obtains the response form of the template form 52. Then the template editor 135 retrieves one or more designated editing rules from the editing rule DB 133. For example, it obtains editing rules to return an error-free response or to return an error response. The template editor 135 creates the test response form 53 by editing the response form of the template form 52 under the retrieved editing rules. The created test response form 53 is given to the e-commerce unit 110a as a response message.

The activity 112a of the e-commerce unit 110a receives the test response form 53 and performs a prescribed process. Depending on the result of this process, that is, depending on whether the result is obtained as intended or not, it can be confirmed whether the e-commerce unit 110a operates successfully. Specifically, the user can confirm whether a normal process is performed when the test response form 53 is an error-free response or whether an error process is performed when the form 53 includes an error. For example, when a normal process is performed even if the test response form 53 includes an error, the user can confirm that the new program describing the processes of the e-commerce unit 110a has bugs.

Next the processes of the stub will be described in detail.

Figure 9:
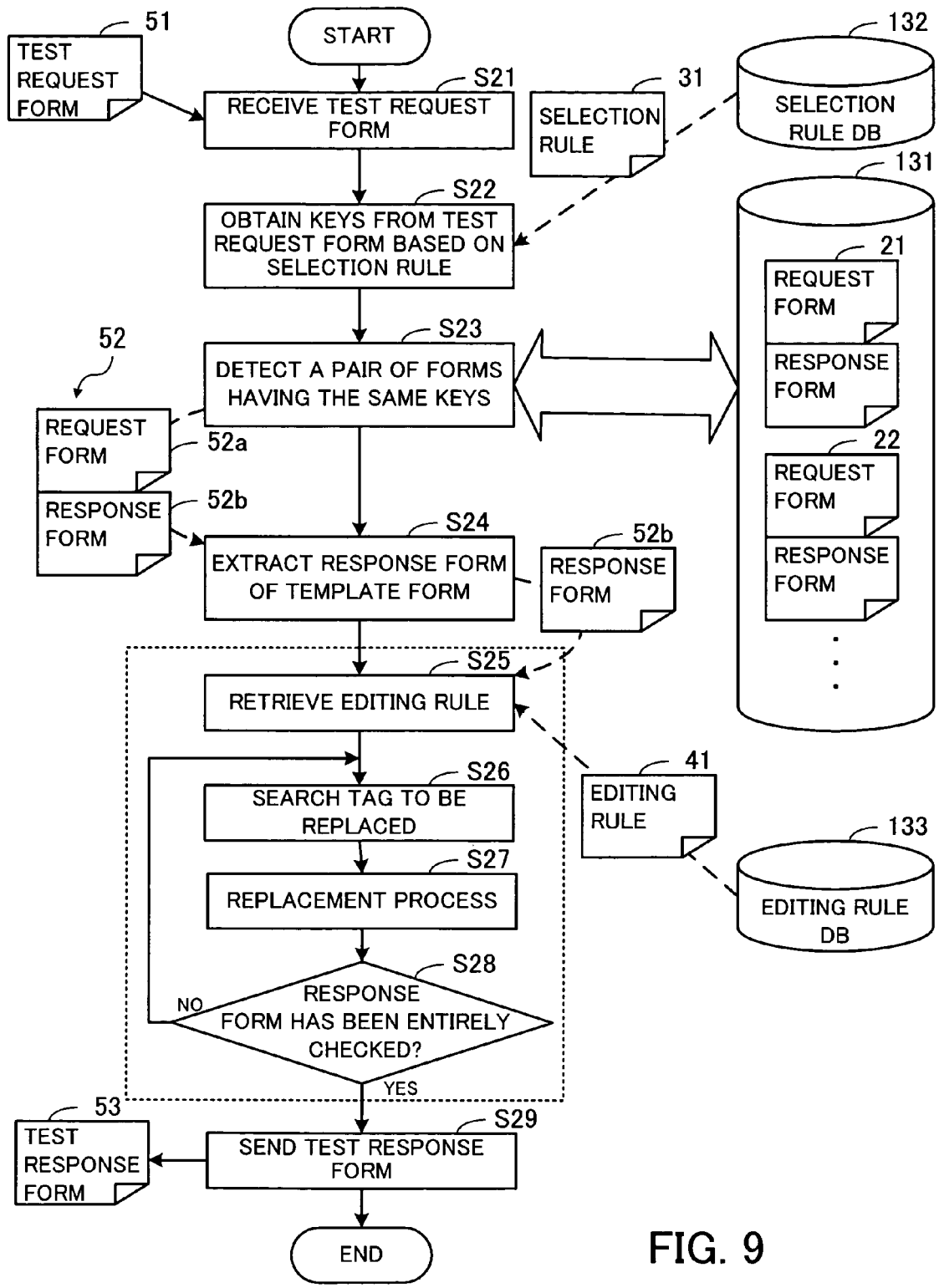
FIG. 9 is a flowchart showing a process executed by a stub in detail.

FIG. 9 is a flowchart showing the detailed processes of the stub. The processes in this figure will be described following the step numbers. In this example, the selection rule 31 is used to select a template form, and the editing rule 41 to create a test response form.

[Step S21] The template selector 134 receives a test request form 51 from the e-commerce unit 110a.

[Step S22] The template selector 134 retrieves the selection rule 31 from the selection rule DB 132. The template selector 134 obtains keys from the test request form 51 based on the selection rule 31. Specifically, the template selector 134 detects tags (item names) specified by the selection rule 31, from the test request form 51 written in XML, and obtains the tags (keys) and their contents.

[Step S23] The template selector 134 searches the transaction DB 131 for a request form having the same keys and contents as the test request form 51. Then the template selector 134 gives a transaction log including the request form 52a detected under the selection rule 31, to the template editor 135 as a template form 52.

[Step S24] The template editor 135 extracts a response form 52b from the template form 52 composed of the request form 52a and the response form 52b.

[Step S25] The template editor 135 retrieves the previously selected editing rule 41 from the editing rule DB 133.

[Step S26] The template editor 135 detects a tag to be edited under the editing rule 41 from the response form 52b.

[Step S27] The template editor 135 edits the tag to be edited of the response form 52b under the editing rule 41.

[Step S28] The template editor 135 determines whether the response form 52b have been entirely checked. When yes, the process goes onto S29. When items that have not been checked remains, the process returns back to step S26 to detect a next tag to be edited.

[Step 29] The template editor 135 sends a test response form 53 created by steps S25 to S28, as a response message.

In this way, the stub 130 can automatically create the test response form 53 in response to the test request form 51, thereby responding the e-commerce unit 110a.

Figure 10:
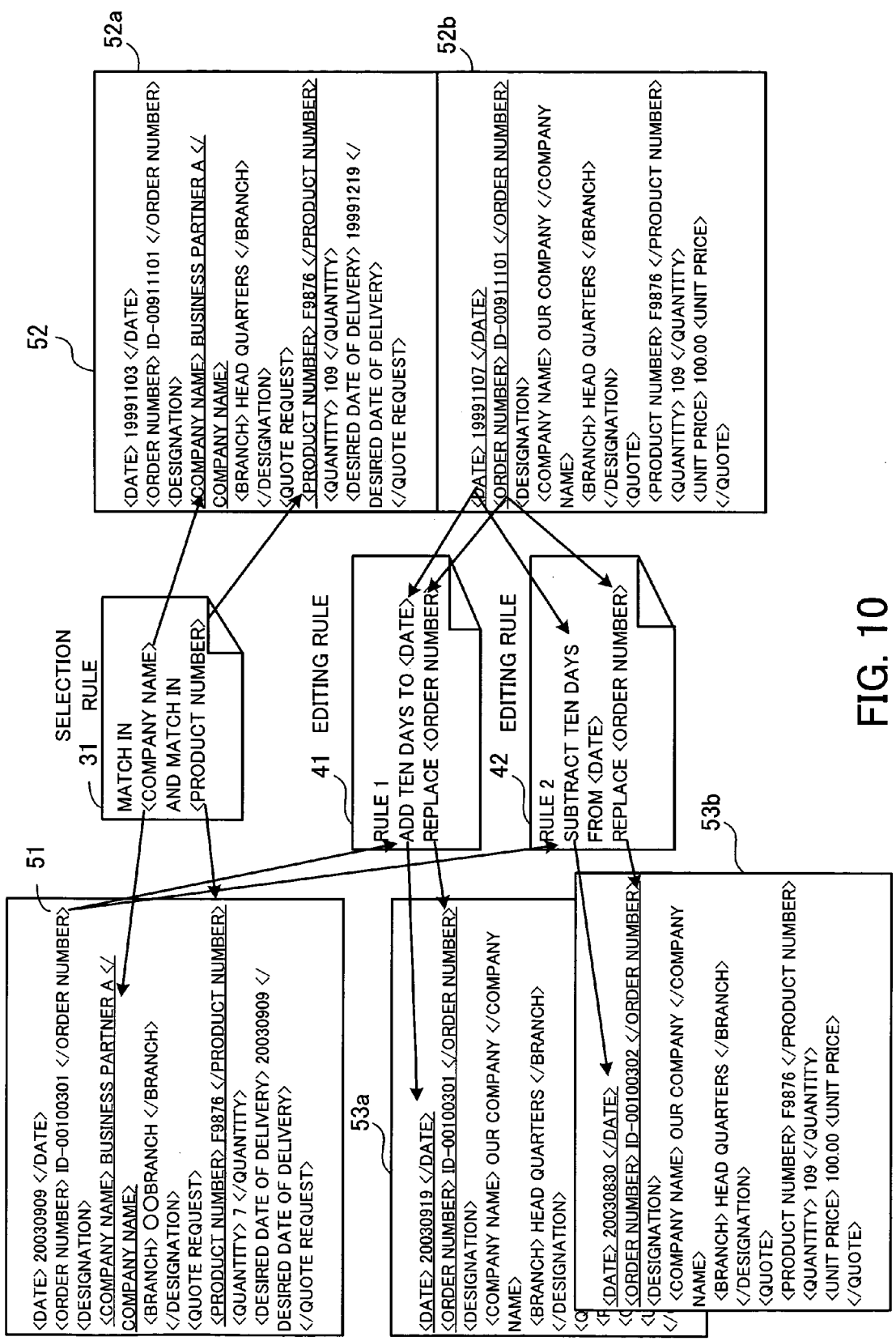
FIG. 10 shows examples of responses made by the stub.

FIG. 10 shows examples of responses made by the stub. For example, the selection rule 31, "match in <company name> and match in <product number>", is used to select a template form. Therefore, when the e-commerce unit 110a outputs a test request form 51 with a company name "partner A" and a product name "F9876", a template log of which the request form 52a has the same company name and product name is selected as a template form 52. Then editing rules 41, 42 are applied to the response form 52b of the template form 52.

The editing rule 41 is "add ten days to <date> and replace <order number>". Therefore, the contents of <date> tag in the response form 52b of the template form 52 are replaced with date "20030919" calculated by adding 10 days to the date of the test request form 51. In addition, the contents of <order number> tag in the response form 52b of the template form 52 are replaced with a unique number "ID-00100301" which has not been used. As a result, a test response form 53a can be created.

The editing rule 42, on the other hand, is "subtract ten days from <date> and replace <order number>". Therefore, the contents of <date> tag in the response form 52b of the template form 52 are replaced with date "20030830" calculated by subtracting ten days from the date of the test request form 51. In addition, the contents of <order number> tag are replaced with a unique number "ID-00100302" which has not been used. As a result, a test response form 53b can be created.

Since the test response form 53b has a past date, the e-commerce unit 110a should execute an error process for the error data. When the error process is performed as intended, the unit 110a is identified as operating successfully.

FIG. 11 to FIG. 14 show editing rules.

Figure 11:
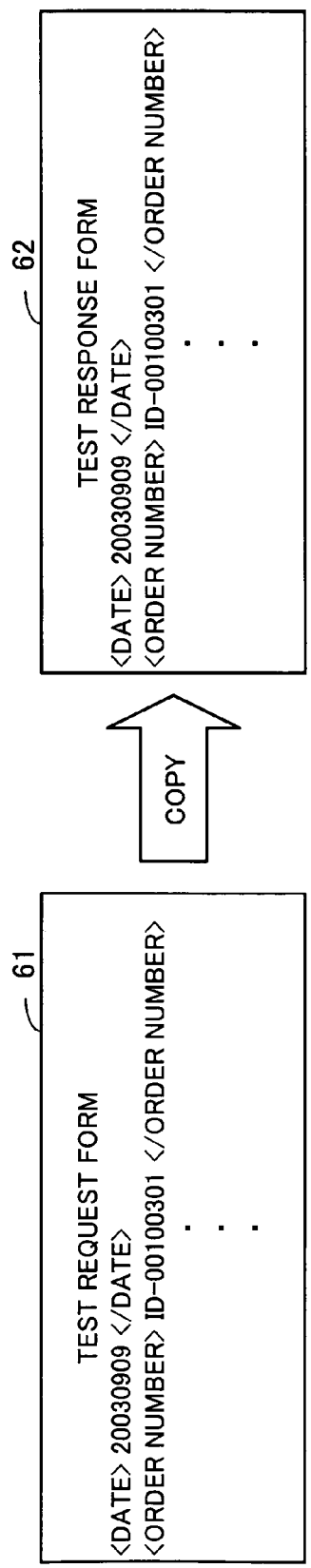
FIG. 11 shows editing rules of copy.

FIG. 11 shows editing rules of copy. These editing rules are for using a part of the test request form 61 as a part of a test response form 62. For example, the editing rules of FIG. 11 show copy of the contents of <date> and <order number>. In e-commerce, request messages have many contents that should be used as they are. For example, the following reasons are given.

A response form is treated for another product if it does not have the same product number as a request form.

A response form is treated for another order if it does not have the same order number as a request form.

Such editing rules of copy are useful for creating a test response form satisfying these conditions.

Figure 12:
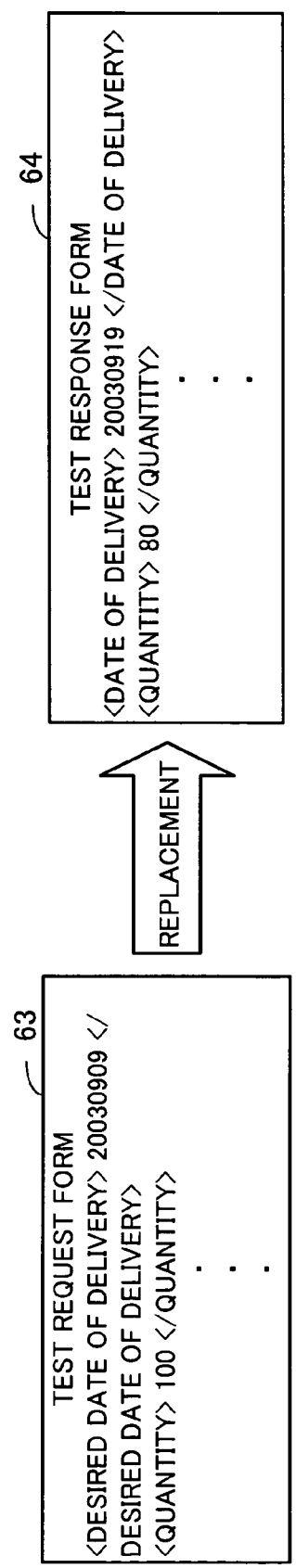
FIG. 12 shows editing rules of replacement.

FIG. 12 shows editing rules of replacement. Under these editing rules, the contents of a part of a test request form 63 are replaced with other contents that are to be used in a test response form 64. FIG. 12 shows an example in which the name of <desired date of delivery> tag is changed to <date of delivery> and ten days are added to the desired date. In addition, the value of <quantity> tag is changed to a value calculated by subtracting twenty.

This is useful to see how to work actually. That is, in actual e-commerce transactions, there are many cases where data cannot be copied like the example of FIG. 11. By replacing and editing the contents of a test request form as follows, more realistic operation can be simulated.

Change a date of delivery because shipment can not be made on a desired date of delivery.

Change the quantity of products because a desired quantity of products can not be shipped.

Bring down a unit price when the number of products greater than a specified number is to be purchased.

Add other costs such as tax and service fee.

Such editing rules of replacement are useful for creating a test response form satisfying these conditions.

Figure 13:
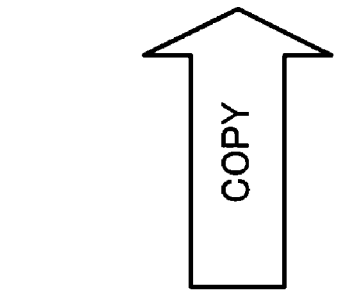
FIG. 13 shows editing rules stipulating use of a template form.

FIG. 13 shows editing rules indicating how to use a template form. In this example, the contents of the response form 65 of a template form meeting selection rules are used as those of a test response form 66, without replacement. Such editing rules are useful for the following reasons.

A test with the contents that were actually used in the past should be done (to check if the functionality does not deteriorate).

An error due to duplicate transmission caused by the same order number as a past form should be created on purpose.

Figure 14:
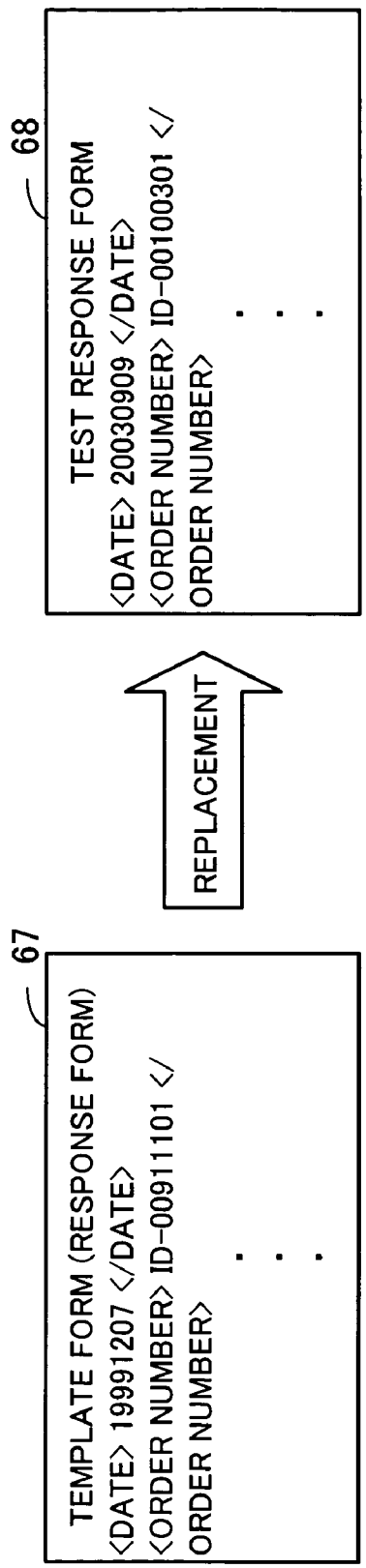
FIG. 14 shows editing rules stipulating replacement of a template form.

FIG. 14 shows editing rules indicating how to replace the contents of a template form. In this example, the contents of the response form 67 of a template form meeting selection rules are replaced with new contents that are to be used in a test response form 68. Referring to FIG. 14, the contents of <date> tag is replaced with the current date. In addition, the contents of <order number> tag are changed to a unique number.

Such editing rules are useful for the following reasons.

The <date> tag should show the current date for operation check.

Use of a past order number causes an error due to duplicate transmission, with the result that normal-operation test cannot be performed.

It should be noted that the examples shown in FIGS. 11 to 14 are for normal-operation test. In e-commerce, the following unrecognizable XML documents may be communicated depending on the implementation environment and operation mechanism of a partner system (that is, data is created by users, not by a system).

An XML document has no contents.

An document is not an XML document (simple text file, or no XML statement exists).

Route elements of an XML document do not exist.

An XML document does not meet DTD rules (necessary items do not exist or an order is different).

Such cases can be handled by arranging rules for transforming an XML document (transformation between XML documents by using extensible style language transformations (XSLT)).

It should be noted that the rules shown in FIG. 11 to FIG. 14 are combined and used.

Further, for replacing original contents, the following replacement patterns are considered.

FIG. 15 shows an example of data replacement patterns. In this example, the replacement patterns include "content replacement" and "XML-document replacement". Contents that can be replaced include "date", "time", "numeric value", and "character string including date, time and numeric value".

The replacement of "date" includes "set the current date", "add days", "subtract days", and "change date format". "Set the current date" replaces an original date with the current date. "Add days" adds desired days to an original date. "Subtract days" subtracts desired days from an original date. "Change date format" changes the writing format of date. For example, "20030830" is changed to "03/08/30".

Replacement of "time" includes "set the current time", "add time", "subtract time", "change time format". "Set the current time" replaces an original time with the current time. "Add time" adds desired time to an original time. "Subtract time" subtracts desired time from an original time. "Change time format" changes the writing format of time. For example, "13:30" is changed to "13 h45 m".

Replacement of "numeric value" includes "add value", "subtract value", "change numeric value format (edition for comma or digit for decimal point)", "four operation arithmetic" and "set random numbers". "Add value" adds a desired value to an original value. "Subtract value" subtracts a desired value from an original value. "Change numeric value format (edition for comma or digit for decimal point)" changes the writing format of a numeric value. "Four operation arithmetic" applies an operation such as addition, subtraction, multiplication, or division, to an original value. "Set random numbers" replaces an original value with randomly created numbers.

Replacement of "character string including date, time, and numeric value" includes "set fixed value", "delete character string", "combine character strings". "Set fixed value" sets a previously designated value. "Delete character string" deletes desired characters from an original character string. "Combine character strings" combines desired characters to an original character string.

"XML-document replacement" edits a "tag" of an XML document, and includes "delete", "add", "exchange positions". "Delete" deletes a desired tag. "Add" adds a desired tag. "Exchange positions" exchanges the positions of tags.

In the above description, this invention is applied for e-commerce over the Internet. This invention, however, can be used for e-commerce via a network (including a telephone network) other than the Internet.

Further, the above embodiment of the invention uses such an advantage of XML that a document structure is defined with tags. This invention, however, is applied to a document having another structure such as standard generalized markup language (SGML) or extensible hyper text markup language (XHTML).

The above-described processing functions are actually implemented on a computer server with the test support program describing processing contents of the intended functions. The test support program is stored in a computer-readable storage medium. Suitable computer-readable recording media include magnetic storage media, optical discs, magneto-optical storage media, and semiconductor memory devices. Magnetic storage media include hard disk drives (HDD), flexible disks (FD), and magnetic tapes. Optical discs include digital versatile discs (DVD), DVD-random access memory (DVD-RAM), compact disc read-only memory (CD-ROM), CD-recordable (CD-R), CD-rewritable (CD-RW). Magneto-optical storage media include magneto-optical discs (MO).

To distribute program products, portable storage media, such as DVD and CD-ROM, are used. Network-based distribution of software program has also become popular, in which master program files stored in a server computer are downloaded to user computers via a network.

Each computer stores the test support program in its local storage unit, which has previously been installed from a portable storage medium or downloaded from a server computer. The computer performs intended functions by executing the program read out of the local storage unit. As an alternative way of program execution, the computer may execute the program, reading out program files directly from a portable storage medium. Another alternative method is that the computer dynamically downloads the test support program from a server computer when they are demanded and executes them upon delivery.

As described above, in this invention, past messages are edited and used as responses, thus making it possible to easily create realistic responses to test request messages. As a result, reliable operation check can be performed effectively for functions that operate with other unspecified servers.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A test support program to check program performance, the test support program causing a computer to execute the steps of:
    storing, when a request message is sent to a partner server over a network and a response message arrives from the partner server, a pair of the request message and the response message as a message log;
    selecting, when a processing function based on a program under development being checked outputs a test request message, a message log appropriate to the test request message as a template message under a preset selection rule;
    creating a test response message by editing a response message of the message log selected, under a preset editing rule; and
    sending the test response message created, as a response to the test request message.

2. The test support program according to claim 1, wherein the message log is stored in a designated tag-based structural document format.

3. The test support program according to claim 2, wherein the selection rule stipulates that a message log including a request message having same contents in a prescribed tag as the test request message is selected.

4. The test support program according to claim 1, wherein the editing rule is a rule to return the test response message allowing the program under development to perform a normal process or a rule to return the test response message making the program under development detect an error.

5. The test support program according to claim 1, wherein the editing rule stipulates that contents of the test request message are used for some items of the test response message.

6. The test support program according to claim 1, wherein the editing rule stipulates that contents of some items of the test response message are replaced with different contents based on contents of the test request message.

7. The test support program according to claim 1, wherein the editing rule stipulates that contents of the response message of the template message are used for some items of the test response message.

8. The test support program according to claim 1, wherein the editing rule stipulates that contents of some items of the test response message are replaced with different contents based on contents of the response message of the template message.

9. The test support program according to claim 1, wherein the program under development describes operation for doing electronic commerce over the network.

10. A test support method for checking program performance, the test support method causing a computer to execute the steps of:
    storing, when a request message is sent to a partner server over a network and a response message arrives from the partner server, a pair of the request message and the response message as a message log;
    selecting, when a processing function based on a program under development being checked outputs a test request message, a message log appropriate to the test request message as a template message under a preset selection rule;
    creating a test response message by editing a response message of the template message selected, under a preset editing rule; and
    sending the test response message created, as a response to the test request message.

11. A test support device for checking program performance comprising:
    log storage means for storing, when a request message is sent to a partner server over a network and a response message arrives from the partner server, a pair of the request message and the response message as a message log;
    template selecting means for selecting, when a processing function based on a program under development being checked outputs a test request message, a message log appropriate to the test request message from message logs being stored in the log storage means, as a template message under a preset selection rule;
    response message creating means for creating a test response message by editing a response message of the template message selected by the template selecting means, under a preset editing rule; and
    response means for sending the test response message created, as a response to the test request message.

12. A computer-readable recording medium storing a test support program to check program performance, the test support program causing a computer to execute the steps of:
    storing, when a request message is sent to a partner server over a network and a response message arrives from the partner server, a pair of the request message and the response message as a message log;
    selecting, when a processing function based on a program under development being checked outputs a test request message, a message log appropriate to the test request message as a template message under a preset selection rule;
    creating a test response message by editing a response message of the template message selected, under a preset editing rule; and
    sending the test response message created, as a response to the test request message.

* * * * *